US012617954B2

(12) United States Patent
Tsuji et al.

(10) Patent No.: US 12,617,954 B2
(45) Date of Patent: May 5, 2026

(54) COATING AGENT FOR FILM, LAMINATE, AND METHOD FOR MANUFACTURING PRINTED ARTICLE

(71) Applicant: TORAY INDUSTRIES, INC., Tokyo (JP)

(72) Inventors: Yuichi Tsuji, Otsu (JP); Shiro Kobayashi, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 641 days.

(21) Appl. No.: 17/912,980

(22) PCT Filed: Mar. 31, 2021

(86) PCT No.: PCT/JP2021/013844
    § 371 (c)(1),
    (2) Date: Sep. 20, 2022

(87) PCT Pub. No.: WO2021/201104
    PCT Pub. Date: Oct. 7, 2021

(65) Prior Publication Data
    US 2023/0151232 A1    May 18, 2023

(30) Foreign Application Priority Data

Mar. 31, 2020    (JP) ................................. 2020-062551
    Oct. 30, 2020    (JP) ................................. 2020-182147

(51) Int. Cl.
    C09D 11/101    (2014.01)
    B41M 5/00    (2006.01)
    B41M 7/00    (2006.01)
    C08G 18/42    (2006.01)
    C08G 18/67    (2006.01)
    C09D 11/102    (2014.01)
    C09D 175/14    (2006.01)

(52) U.S. Cl.
    CPC ......... C09D 11/101 (2013.01); B41M 5/0011 (2013.01); B41M 7/0081 (2013.01); C08G 18/42 (2013.01); C08G 18/6755 (2013.01); C09D 11/102 (2013.01); C09D 175/14 (2013.01)

(58) Field of Classification Search
    CPC .. C09D 11/101; C09D 11/102; C09D 175/14; C09D 5/002; C09D 175/16; B41M 5/001;

B41M 7/0081; C08G 18/42; C08G 18/6755; C08G 18/10; C08G 18/4825; C08G 18/672; C08G 18/792
See application file for complete search history.

(56) References Cited

U.S. PATENT DOCUMENTS

| | | | |
|---|---|---|---|
| 11,001,731 B2 | 5/2021 | Potzmann | |
| 2008/0176049 A1* | 7/2008 | Ro ..................... | C08G 18/4825 |
| | | | 264/401 |
| 2009/0136696 A1 | 5/2009 | Faltermeier et al. | |
| 2011/0262739 A1* | 10/2011 | Watase .................... | B41M 3/12 |
| | | | 427/146 |
| 2017/0136750 A1* | 5/2017 | Osaku ...................... | B32B 7/04 |

FOREIGN PATENT DOCUMENTS

| | | |
|---|---|---|
| CN | 108431066 A | 8/2018 |
| EP | 3 184 565 A1 | 6/2017 |
| EP | 3 409 696 A1 | 12/2018 |
| EP | 3 412 451 A1 | 12/2018 |
| EP | 3974201 A1 | 3/2022 |
| JP | 3-252472 A | 11/1991 |
| JP | 6-157963 A | 6/1994 |
| JP | 6-172695 A | 6/1994 |
| JP | 2017-171851 A | 9/2017 |
| WO | WO 2014/081004 A1 | 5/2014 |
| WO | WO 2016/159294 A1 | 10/2016 |
| WO | WO 2020/235557 A1 | 11/2020 |

OTHER PUBLICATIONS

Author Unknown, "NCO", ISBN 978-7-5643-1803-1, http://press.swjtu.edu.cn, Jun. 2012, p. 262 (4 pages total) with partial translation.
Chinese Office Action and Search Report dated Feb. 25, 2023 for Application No. 202180024067.7.
Extended European Search Report for European Application No. 21782249.3, dated Sep. 19, 2023.
International Search Report, issued in PCT/JP2021/013844, PCT/ISA/210, dated Jun. 29, 2021.
Written Opinion of the International Searching Authority, issued in PCT/JP2021/013844, PCT/ISA/237, dated Jun. 29, 2021.
Chinese Office Action and Search Report for Chinese Application No. 202180024067.7, dated Jul. 15, 2023.

* cited by examiner

*Primary Examiner* — Jessica M Roswell
(74) *Attorney, Agent, or Firm* — Birch, Stewart, Kolasch & Birch, LLP

(57) ABSTRACT

An object of the present invention is to provide a coating agent for a film that can exhibit sufficient adhesion to a film even when the active energy ray-curable ink is used. The present invention provides a coating agent for a film including a compound (a) having two or more (meth)acryloyl groups and an isocyanate group.

18 Claims, No Drawings

COATING AGENT FOR FILM, LAMINATE, AND METHOD FOR MANUFACTURING PRINTED ARTICLE

TECHNICAL FIELD

The present invention relates to a coating agent for a film, a laminate, and a method for manufacturing a printed article.

BACKGROUND ART

As the global population increases, demand for flexible packaging, which is mainly used for packaging food and daily necessities, is expected to continue to grow. According to gravure printing, which is currently the mainstream in flexible packaging printing, printed articles with vivid appearance can be obtained. On the other hand, since the gravure printing uses an ink containing a large amount of solvents, a large amount of energy is required for drying an ink solvent and an exhaust treatment, and an environmental load is large. Furthermore, in the flexible packaging printing industry, the needs of the market have changed from mass production and mass consumption in the related art to small lots, various products, and short delivery, and therefore plate margins and plate making margins are expensive. Therefore, the production cost of gravure printing, which is good at large-lot printing, has been increasing. Therefore, in recent years, attempts have been made to perform flexible packaging printing using lithographic printing, which is inexpensive in terms of plate margins and plate making margins, is suitable for small-lot, short-delivery printing, and is superior in terms of cost (refer to Patent Document 1).

The lithographic printing is a printing system widely used as a system capable of inexpensively supplying a large volume of printed article at high speed. In recent years, there is a request for the reduction of volatile components contained in lithographic printing inks in addressing the environmental issues. For this reason, the use of ink which is free from volatile components and is instantaneously curable with an active energy ray irradiation, is in progress (refer to Patent Document 2). In the flexible packaging printing, since the printing is performed by a roll-to-roll method, quick drying property of the ink is important. Active energy ray-curable lithographic printing using active energy ray-curable ink not only has environmental advantages, but also saves energy and has high productivity because it does not require a drying step.

PRIOR ART DOCUMENT

Patent Documents

Patent Document 1: Japanese Patent Laid-open Publication No. 2004-358788
Patent Document 2: Japanese Patent Laid-open Publication No. 2017-132895

SUMMARY OF THE INVENTION

Problems to be Solved by the Invention

However, in general, the active energy ray-curable ink has low adhesion to a film. Further, in the active energy ray-curable lithographic printing, adhesion of ink to a film is insufficient as compared with gravure printing, and an applicable film is also limited.

Therefore, an object of the present invention is to provide a coating agent for a film that can exhibit sufficient adhesion to a film even when the active energy ray-curable ink is used.

Solutions to the Problems

The present invention provides a coating agent for a film including a compound (a) having two or more (meth)acryloyl groups and an isocyanate group.

The present invention also provides a laminate including a cured layer of the coating agent for a film of the present invention on at least one surface of a film.

The present invention also provides a method for manufacturing a printed article, the method including a step of transferring the coating agent for a film of the present invention and an active energy ray-curable ink to a film and then irradiating the film with an active energy ray.

Effects of the Invention

The coating agent for a film according to the present invention can improve adhesion of an active energy ray-curable ink to a film.

EMBODIMENTS OF THE INVENTION

Hereinafter, the present invention will be specifically described. In the present invention, "or more" means the same as or more than the numerical value indicated therein. In addition, "or less" means the same as or less than the numerical value indicated therein. In addition, "(meth)acrylate" is a generic name including acrylate and methacrylate, and a "(meth)acryloyl group" is a generic name including an acryloyl group and a methacryloyl group.

The coating agent for a film (hereinafter, may be referred to as a "coating agent") of the present invention contains a compound (a) having two or more (meth)acryloyl groups and an isocyanate group.

Since the compound (a) has two or more (meth)acryloyl groups, the compound (a) is radically polymerized by irradiation with an active energy ray. Thus, the coating agent can be cured to form a film. In addition, since the compound (a) has two or more (meth)acryloyl groups, by irradiation with an active energy ray, the (meth)acrylate contained in the active energy ray-curable ink transferred onto the coating agent according to the present invention and the compound (a) undergo a crosslinking reaction, and adhesion between the coating agent and the active energy ray-curable ink can be improved.

The isocyanate group contained in the coating agent reacts with a polar group on the outermost surface of the film, whereby the adhesion between the film and the coating agent can be improved. Since the coating agent according to the present invention has two or more (meth)acryloyl groups and isocyanate groups in the same compound (a), the coating agent exhibits high adhesion to both the active energy ray-curable ink and the film, and can be instantaneously cured by the active energy ray.

On the other hand, when a compound having two or more (meth)acryloyl groups and a compound having an isocyanate group are independently contained in the coating agent, the adhesion to the film or the active energy ray-curable ink is deteriorated. This is because the compound having an isocyanate group is not cured by irradiation with an active energy ray, and thus the cured film itself of the coating agent becomes weak. In addition, since the compound having an isocyanate group does not enter the crosslinked structure, it is difficult for the compound having an isocyanate group to stay in the cured film and on the surface of the cured film, and the compound having an isocyanate group cannot sufficiently contribute to adhesion between the coating agent and the active energy ray-curable ink and adhesion between the film and the coating agent. Further, since the polar group on the outermost surface of the film does not react with the (meth)acryloyl group, the adhesion between the film and the coating agent is further insufficient.

An acrylic equivalent of the coating agent for a film according to the present invention is preferably 100 g/eq or more, more preferably 150 g/eq or more, and still more preferably 200 g/eq or more from the viewpoint of improving the storage stability. In addition, the acrylic equivalent is preferably 450 g/eq or less, more preferably 400 g/eq or less, and still more preferably 350 g/eq or less because curability of the coating agent by active energy rays is improved, and the adhesion between the coating agent and the active energy ray-curable ink is further improved. In the present invention, the acrylic equivalent refers to the number of grams (unit: g/eq) of the coating agent for a film required for the amount of (meth)acryloyl groups contained therein to be 1 mol.

The isocyanate content of the coating agent for a film according to the present invention is preferably 2 mass % or more, more preferably 3 mass % or more, still more preferably 4 mass % or more because the adhesion to the film is further improved. In addition, the content is preferably 10 mass % or less, more preferably 9 mass % or less, and still more preferably 8 mass % or less, from the improvement of the storage stability. The isocyanate content represents the mass of isocyanate groups in the total mass of the coating agent.

In particular, the coating agent for a film according to the present invention more preferably has an acrylic equivalent of 100 g/eq or more and 450 g/eq or less and an isocyanate content of 2 mass % or more and 10 mass % or less.

The compound (a) preferably has a urethane bond because the adhesion to a film and an active energy ray-curable ink is further improved.

The weight-average molecular weight of the compound (a) is preferably 1,000 or more and preferably 5,000 or less from the viewpoint of improving the adhesion to the film and the active energy ray-curable ink. The weight-average molecular weight of the compound (a) can be determined by a measurement using gel permeation chromatography (GPC) and conducting the calculation in terms of polystyrene.

The content of the compound (a) in the coating agent for a film according to the present invention is preferably 70 mass % or more, more preferably 75 mass % or more, still more preferably 80 mass % or more, even still more preferably 95 mass % or more because the adhesion between the film and the coating agent and the adhesion between the active energy ray-curable ink and the coating agent are further improved. In the coating agent for a film of the present invention, it is also a preferred embodiment that the amount of the compound (a) is 100 mass %.

The compound (a) in the coating agent for a film according to the present invention can be synthesized by reacting a (meth)acrylate having a hydroxyl group with a polyisocyanate compound.

When a polyol compound is added and reacted as necessary, a chain extension reaction of the polyisocyanate compound proceeds, and a compound having a larger molecular weight can be synthesized. That is, in the coating agent for a film of the present invention, the compound (a) preferably has a structure obtained by reacting (meth)acrylate having a hydroxyl group, a polyol compound, and a polyisocyanate compound. In the compound (a), the content of the isocyanate group is preferably 0.9 mol or more and 2.2 mol or less, with respect to 1 mol of the hydroxyl group. By setting the content of the isocyanate group to 0.9 mol or more, more preferably 1.0 mol or more, and still more preferably 1.2 mol or more with respect to 1 mol of the hydroxyl group, the adhesion can be effectively improved. When the content is 2.2 mol or less, and more preferably 1.7 mol or less, the storage stability can be improved.

Specific examples of the (meth)acrylate having a hydroxyl group include hydroxyethyl (meth)acrylate, hydroxypropyl (meth)acrylate, hydroxybutyl acrylate, caprolactone (meth)acrylate, trimethylolpropane di(meth)acrylate, glycerin di(meth)acrylate, pentaerythritol di(meth)acrylate, pentaerythritol tri(meth)acrylate, diglycerin di(meth)acrylate, diglycerin tri(meth)acrylate, ditrimethylolpropane di(meth)acrylate, ditrimethylolpropane tri(meth)acrylate, dipentaerythritol di(meth)acrylate, dipentaerythritol tri(meth)acrylate, dipentaerythritol tetra(meth)acrylate, dipentaerythritol penta(meth)acrylate, and ethylene oxide adducts, propylene oxide adducts, tetraethylene oxide adducts, and lactone adducts thereof. These (meth)acrylates having a hydroxyl group can be used singly or in combination of two or more kinds thereof.

Specific examples of the polyisocyanate compound include toluene diisocyanate, diphenylmethane diisocyanate, xylylene diisocyanate, naphthalene diisocyanate, cyclohexane diisocyanate, isophorone diisocyanate, 4,4-methylenebiscyclohexyl diisocyanate, hydrogenated xylylene diisocyanate, hexamethylene diisocyanate, lysine diisocyanate, and trimethylhexamethylene diisocyanate, and a nurate-modified product, an adduct-modified product, a biuret-modified product, an allophanate-modified product, and the like of these polyisocyanates can also be used. These diisocyanates can be used alone or in combination of two or more thereof.

Specific examples of the polyol compound include neopentyl glycol, 1,3-butanediol, 1,4-butanediol, tripropylene glycol, tetramethylene glycol, glycerin, trimethylolpropane, pentaerythritol, ditrimethylolpropane, diglycerin, dipentaerythritol, ethylene oxide adducts, propylene oxide adducts, tetraethylene oxide adducts, and lactone adducts.

The polyol compound is preferably polyester polyol because the heat resistance and coating film properties of the coating agent-cured layer can be improved to impart resistance to a boil/retort treatment to a printed article containing the coating agent-cured layer.

The polyester structure in the polyester polyol is obtained by reacting a dicarboxylic acid derivative with diols. Specific examples of the dicarboxylic acid derivative include phthalic acid, isophthalic acid, terephthalic acid, adipic acid, oxalic acid, maleic acid, fumaric acid, and sebacic acid. It is possible to use polyester polyol in which these are reacted with diols to form a polyester structure and a terminal thereof is a hydroxyl group.

In addition, a polyol compound having a carbonate structure can also be used. Specific examples thereof include pentamethylene carbonate diol, hexamethylene carbonate diol, hexane carbonate diol, and decane carbonate diol. In addition, these polyol compounds can be used singly or in combination of two or more kinds thereof.

The coating agent for a film according to the present invention preferably contains a urethane compound (b) separately from the compound (a). By containing the urethane compound (b), the adhesion to the film and the active energy ray-curable ink can be further improved.

The compound (b) preferably has a (meth)acryloyl group. Since the compound (b) also has a (meth)acryloyl group, the compound (b) is radically polymerized by irradiation with an active energy ray, and is crosslinked with itself and the compound (a) to cure the coating agent, so that film formability can be improved. In addition, similarly to the compound (a), by irradiation with an active energy ray, the (meth)acrylate contained in the active energy ray-curable ink transferred onto the coating agent according to the present invention undergo a crosslinking reaction, and adhesion between the coating agent and the active energy ray-curable ink can be improved.

Further, the compound (b) preferably has a polyester structure. When the compound (b) has a polyester structure, the heat resistance and coating film properties of the coating agent-cured layer can be improved to impart resistance to a boil/retort treatment to a printed article containing the coating agent-cured layer.

The polyester structure in the compound (b) is obtained by reacting a dicarboxylic acid derivative with diols. Specific examples of the dicarboxylic acid derivative include phthalic acid, isophthalic acid, terephthalic acid, adipic acid, oxalic acid, maleic acid, fumaric acid, and sebacic acid, and polyester polyol in which these are reacted with diols to form a polyester structure and the terminal is a hydroxyl group can be used.

Further, as the compound (b), a polyol compound having a carbonate structure can also be used. Specific examples thereof include pentamethylene carbonate diol, hexamethylene carbonate diol, hexane carbonate diol, and decane carbonate diol. In addition, these polyol compounds can be used singly or in combination of two or more kinds thereof.

The coating agent for a film according to the present invention preferably contains a white pigment (c) as a base color of a transparent plastic film. This makes it possible to simultaneously improve the hiding property by applying the base color and impart the adhesion to the ink to the film having low adhesion.

Specific examples of the white pigment (c) include titanium dioxide, zinc oxide, and alumina white.

The particle size of the white pigment (c) is preferably 200 nm or more and 300 nm or less at which the transmittance of visible light is most reduced by scattering.

The content of the white pigment (c) is preferably 20 mass % or more, more preferably 30 mass % or more, and further preferably 40 mass % or more. In addition, the content is preferably 70 mass % or less, more preferably 60 mass % or less, still more preferably 50 mass % or less in order to improve the fluidity and to obtain an excellent transference.

The coating agent for a film according to the present invention preferably contains a wax (d) because scratch resistance and slippage of the coating agent cured film are improved.

Examples of the wax (d) include natural waxes such as carnauba wax, wood wax, montan wax, and lanolin, and synthetic waxes such as hydrocarbon-based wax, polytetrafluoroethylene wax, polyamide wax, and a silicone compound. Among them, the hydrocarbon-based wax is preferable because it is excellent in scratch resistance.

Specific examples of the hydrocarbon wax include Fischer-Tropswax, polyethylene wax, polypropylene wax, paraffin wax, and microcrystalline wax. These waxes can be used singly or in combination of two or more kinds thereof.

The average particle size of the wax (d) is preferably 0.5 μm or more and 4 μm or less, and more preferably 1 μm or more and 2 μm or less, in which scratch resistance is improved and it is less likely to cause irregularities on the surface of the ink film. Here, the average particle size refers to a value of D50 in measurement by a laser diffraction/light scattering method.

The content of the wax (d) is preferably 0.1 mass % or more, more preferably 0.5 mass % or more, and still more preferably 1 mass % or more for improving the scratch resistance and slippage. In addition, in order to disperse well and improve the fluidity, the content is preferably 10 mass % or less, more preferably 5 mass % or less, and still more preferably 3 mass % or less.

The coating agent for a film according to the present invention is preferably substantially free of a solvent and a diluting agent. The solvent as used herein refers to a liquid containing no ethylenically unsaturated double bond at 1 atm and 25° C. The phrase "substantially free of a solvent and a diluting agent" as used herein means that the total content of the solvent and the diluting agent in the coating agent is 0.1 mass % or less. When the coating agent according to the present invention is substantially free of the solvent, curability of the coating agent with respect to active energy rays can be improved. In addition, it is possible to suppress a situation in which the solvent passes through the film and transfers to the contents.

When the diluting agent is used for adjusting the viscosity, it is preferable that the diluting agent is a compound containing an ethylenically unsaturated double bond and having low volatility. The low volatility refers to a weight loss ratio of 1 wt. % or less when heated at 110° C. for 1 hour as defined by Method 24 of the United States Environmental Protection Agency (EPA). Polyfunctional (meth)acrylates are preferable, and examples of the bifunctional (meth)acrylate include diethylene glycol di(meth)acrylate, triethylene glycol di(meth)acrylate, polyethylene glycol di(meth)acrylate, tripropylene glycol di(meth)acrylate, 1,3-butylene glycol di(meth)acrylate, neopentyl glycol di(meth)acrylate, trimethylolpropane (meth)acrylate, glycerin di(meth)acrylate, pentaerythritol di(meth)acrylate, diglycerin di(meth)acrylate, ditrimethylolpropane (meth)acrylate, dicyclopentadienetricyclodecane dimethanol di(meth)acrylate, and ethylene oxide adducts, propylene oxide adducts, and tetraethylene oxide adducts thereof. Examples of the trifunctional (meth)acrylate include trimethylolpropane tri(meth)acrylate, ditrimethylolpropane tri(meth)acrylate, glycerin tri(meth)acrylate, isocyanuric acid tri(meth)acrylate, and ethylene oxide adducts and propylene oxide adducts thereof. Examples of the tetrafunctional (meth)acrylate include ditrimethylolpropane tetra(meth)acrylate, diglycerin tetra(meth)acrylate, ethylene oxide adducts and propylene oxide adducts thereof. Examples of the penta- or higher functional (meth)acrylate include dipentaerythritol hexa(meth)acrylate, and ethylene oxide adducts and propylene oxide adducts thereof.

Since the coating agent for a film according to the present invention can suppress transfer between rollers of a lithographic printing machine and liquid scattering, the viscosity at 25° C. and 0.5 rpm is preferably 30 Pa·s or more, and the leveling property after being transferred to a printed article is preferably 200 Pa·s or less. The viscosity referred to herein refers to a value measured using a B-type viscometer.

The coating agent for a film according to the present invention can also be used as an anchor coating agent which is transferred to a film and onto which an active energy ray-curable ink is transferred. The coating agent for a film according to the present invention can also be used as an overcoat agent for transferring the active energy ray-curable ink to the film in a pattern shape and then transferring the active energy ray-curable ink to the film. Among them, it is preferable to use it as an anchor coating agent that enters between a film and an active energy ray-curable ink having low adhesion and improves the adhesion of the printed article. That is, the active energy ray-curable anchor coating agent is one of preferred embodiments of the coating agent for a film of the present invention.

The laminate according to the present invention includes a cured layer of the coating agent for a film on at least one surface of the film.

In the laminate, an area ratio of a carbon-carbon double bond/a carbonyl group in the cured layer by Raman spectrometry measurement is preferably 0.5 or more and 2.5 or less.

The coating agent cured product of the present invention contains a carbon-carbon double bond derived from a reaction residue of a (meth)acryloyl group having a peak observed in a range of 1600 to 1650 cm$^{-1}$, and a carbonyl group such as a (meth)acryloyl group or an ester group having a peak observed in a range of 1650 to 1750 cm$^{-1}$, and both of them are detected by Raman spectroscopy. The area ratio of the carbon-carbon double bond/carbonyl group is calculated from each peak area of the peak of the carbon-carbon double bond and the peak of the carbonyl group. This area ratio is an index of the acrylic equivalent of the coating agent and the degree of progress of the curing reaction by irradiation with an active energy ray. By setting the acrylic equivalent of the coating agent to 100 g/eq or more and 450 g/eq or less and the irradiation amount of active energy rays to 20 kGy or more and 50 kGy or less, it is possible to obtain a laminate representing the area ratio of carbon-carbon double bond/carbonyl group as described above.

Next, a method for manufacturing a coating agent according to the present invention will be described. The coating agent according to the present invention can be obtained, for example, by heating and mixing the compound (a), and if necessary, the compounds (b) to (d), a diluting agent, and other components at 50° C. to 100° C. After or during mixing, defoaming is preferably performed under vacuum or reduced pressure.

A method for manufacturing a printed article according to the present invention includes a step of transferring a coating agent and an active energy ray-curable ink to a film, and then irradiating the film with an active energy ray. This is a wet-on-wet step in which the active energy ray-curable ink is transferred onto the uncured coating agent or, in reverse order, the coating agent is transferred onto the uncured active energy ray-curable ink, in which the active energy ray irradiation cures the coating agent and the active energy ray-curable ink at once. In this step, the ethylenically unsaturated double bond ((meth)acryloyl group) contained in each of the coating agent and the active energy ray-curable ink reacts with each other and is crosslinked by a covalent bond, so that adhesion between the coating agent and the ink can be further improved. In addition, the coating agent to be transferred to the film can reduce surface irregularities by pressing or leveling by transfer of each color ink before the step of curing by irradiation with an active energy ray, and thus gloss of a non-printing portion of the printed article can be improved and appearance of the printed article is improved.

In addition, the method for manufacturing a printed article according to the present invention may include a step of transferring a coating agent to a film, irradiating the film with an active energy ray, then transferring an active energy ray-curable ink, and irradiating the film with an active energy ray. This is a dry-on-wet step in which the active energy ray-curable ink is transferred onto the cured coating agent, and the coating agent and the active energy ray-curable ink are cured separately by irradiation with an active energy ray. In this step, since the active energy ray-curable ink is transferred to the coating agent after curing, the transferability of the ink is improved. In addition, since the (meth)acryloyl group remaining in the coating agent after curing reacts with the ethylenically unsaturated double bond contained in the active energy ray-curable ink and is cross-linked by a covalent bond, adhesion between the coating agent and the active energy ray-curable ink can be further improved.

Examples of the active energy ray source in the present invention include ultraviolet rays (particularly, LED-UV), electron beams, gamma rays, and the like.

Radiation such as an electron beam and a gamma ray generates high-energy secondary electrons in the irradiation substance, excites surrounding molecules, and generates reactive active species represented by radicals. Due to the chemical structure of the irradiated substance, the generated reactive active species cause various reactions such as crosslinking and decomposition. When the substance to be irradiated is an active energy ray-curable ink, radicals are generated in the active energy ray-curable ink, and radical polymerization proceeds in the active energy ray-curable ink to form a film. In addition, since the radiation also acts on the film through the transferred active energy ray-curable ink, radicals are similarly generated in the polymer constituting the film, and reactions such as crosslinking and decomposition between molecules occur. In particular, when radical polymerization proceeds between the active energy ray-curable ink and the film, a covalent bond is formed between the active energy ray-curable ink and the film, and higher adhesion can be exhibited.

The active energy ray in the present invention is preferably an electron beam. In particular, an electron beam with a low acceleration voltage is preferable because the electron beam has low transmittance, is intensively applied to the surface layer of a target, does not require a special qualification at the time of use, and is easy to handle. Since a transmission depth of the electron beam is determined by the acceleration voltage, the acceleration voltage is preferably 50 kV or more, more preferably 90 kV or more, and still more preferably 110 kV or more, through which a sufficient dose is transmitted through the ink film. In addition, when the transmission depth increases, the dose given to the inside of the substrate also increases, and thus the acceleration voltage is preferably 300 kV or less, more preferably 200 kV or less, and still more preferably 150 kV or less. In addition, as an irradiation dose of the electron beam is higher, the generation amount of radical species in the target substance increases, and the damage of the film also increases. Therefore, the irradiation dose is preferably 10 kGy or more and 100 kGy or less, and more preferably 20 kGy or more and 50 kGy or less.

The active energy ray-curable ink in the present invention preferably contains a compound (e) having an ethylenically unsaturated group and having at least one functional group selected from the group consisting of an amino group, a hydroxyl group, and an acidic group. Since these functional groups react with isocyanate groups contained in the coating agent, adhesion between the coating agent and the active energy ray-curable ink can be further improved.

Examples of the compound (e) include a photosensitive resin having at least one functional group selected from the group consisting of an amino group, a hydroxyl group, and an acidic group such as a carboxyl group, a sulfo group, or a phosphoric acid group, and polyfunctional (meth)acrylate.

It is preferable that the amine value, the hydroxyl group value, and the acid value of these compounds are higher because the adhesion is improved. The amine value can be determined in accordance with an indicator titration method in Test Method Section 3.2 in JIS K 7237: 1995, and the hydroxyl group value and the acid value can be determined in accordance with a neutralization titration method in Test Method Section 3.1 in JIS K 0070: 1992.

As the active energy ray-curable ink, a commercially available product may be used, or an ink prepared by own design may be used. In the case of the active energy ray-curable ink prepared according to their own design, for example, it can be obtained by adding a pigment, and if necessary, an auxiliary agent such as a polymerization initiator to resin varnish in which an acrylic resin, a urethane resin, and a phthalate resin are dissolved in polyfunctional (meth)acrylate, and kneading the mixture in a three-roll mill.

The resin in the active energy ray-curable ink may be a commercially available product or may be synthesized by own design.

Specific examples of the commercially available product include "Hi-Ros" (registered trademark) series manufactured by Seiko PMC Corporation as an acrylic resin, and "DAISODAP" (registered trademark) series manufactured by Osaka Soda Company and "DAISOISODAP" (registered trademark) as a phthalate resin.

When the acrylic resin is synthesized by its own design, the acrylic resin can be obtained by, for example, performing a polymerization reaction in an organic solvent in the presence of a polymerization initiator by mixing two or more kinds of (meth)acrylate monomers. It can also be obtained by copolymerizing styrene, a-methyl-styrene, or the like. Examples of the (meth)acrylate monomer include linear or branched alkyl (meth)acrylate having 1 to 24 carbon atoms, isobornyl (meth)acrylate which is alicyclic alkyl (meth)acrylate, norbornyl (meth)acrylate, norbornane-2-methanol (meth)acrylate, cyclohexyl (meth)acrylate, tricyclopentenyl (meth)acrylate, tricyclopentenyloxy (meth)acrylate, (meth)acrylic acid in which tricyclodecane monomethylol (meth)acrylate is carboxyl group-containing (meth)acrylate, 2-hydroxyethyl acrylate in which itaconic acid, crotonic acid, maleic acid, fumaric acid, vinyl acetate and the like are hydroxyl group-containing (meth)acrylates, dimethylaminoethyl methacrylate, which is an amino group-containing (meth)acrylate such as 2-hydroxybutyl acrylate, and 2-methacryloyloxyethyl acid phosphate which is acrylamide t-butylsulfonic acid, which is a sulfo group-containing (meth)acrylate such as dimethylaminobutyl methacrylate, is phosphate group-containing (meth)acrylate.

The urethane resin can be obtained, for example, by mixing one or more polyols and one or more polyisocyanates and performing a polycondensation reaction in an organic solvent in the presence of a condensing agent. Examples of the polyol include polyester polyols, polycarbonate polyols, and polyether polyols, and examples of the polyisocyanate include polyurethane polyisocyanates and isocyanurates.

The phthalate resin can be obtained, for example, by mixing diallyl orthophthalate or diallyl isophthalate alone or in combination of two, and performing a polymerization reaction in an organic solvent in the presence of a polymerization initiator.

As the polyfunctional (meth)acrylate, known polyfunctional (meth)acrylate can be used. In particular, polyfunctional (meth)acrylate having a hydroxyl group is preferable because adhesion is improved. Specific examples thereof include a poly(meth)acrylate of a polyhydric alcohol such as trimethylolpropane, glycerin, pentaerythritol, diglycerin, ditrimethylolpropane, isocyanuric acid and dipentaerythritol, and alkylene oxide adducts thereof. More specific examples thereof include trimethylolpropane (meth)acrylate, glycerin di(meth)acrylate, pentaerythritol di(meth)acrylate, pentaerythritol tri(meth)acrylate, diglycerin di(meth)acrylate, diglycerin tri(meth)acrylate, ditrimethylolpropane di(meth)acrylate, ditrimethylolpropane tri(meth)acrylate, dipentaerythritol di(meth)acrylate, dipentaerythritol tri(meth)acrylate, dipentaerythritol tetra (meth)acrylate, dipentaerythritol penta(meth)acrylate, and ethylene oxide adducts, propylene oxide adducts, and tetra-ethylene oxide adducts thereof.

In addition to the polyfunctional (meth)acrylate having a hydroxyl group, a polyfunctional (meth)acrylate not containing a hydroxyl group can be used. Specific examples of bifunctional (meth)acrylate include ethylene glycol di(meth) acrylate, diethylene glycol di(meth)acrylate, triethylene glycol di(meth)acrylate, polyethylene glycol di(meth)acrylate, tripropylene glycol di(meth)acrylate, polypropylene glycol di(meth)acrylate, 1,3-butylene glycol di(meth)acrylate, 1,6-hexanediol di(meth)acrylate, 1,9-nonanediol di(meth)acrylate, neopentyl glycol di(meth)acrylate, and dicyclopentadiene cyclodecanedimethanol di(meth)acrylate. Examples of trifunctional (meth)acrylate include trimethylolpropane tri (meth)acrylate, glycerin tri(meth)acrylate, isocyanuric acid tri(meth)acrylate, and ethylene oxide adducts and propylene oxide adducts thereof. Examples of the tetrafunctional (meth)acrylate include pentaerythritol tetra(meth)acrylate, ditrimethylolpropane tetra(meth)acrylate, diglycerin tetra (meth)acrylate, ethylene oxide adducts and propylene oxide adducts thereof. Examples of the penta- or higher functional (meth)acrylate include dipentaerythritol hexa(meth)acrylate, and ethylene oxide adducts and propylene oxide adducts thereof.

Examples of the pigment include a phthalocyanine-based pigment, a soluble azo-based pigment, an insoluble azo-based pigment, a lake pigment, a quinacridone-based pigment, an isoindoline-based pigment, a threne-based pigment, a metal complex-based pigment, titanium oxide, zinc oxide, alumina white, calcium carbonate, barium sulfate, talc, red iron oxide, cadmium red, yellow lead, zinc yellow, dark blue, ultramarine blue, oxide-coated glass powder, oxide-coated mica, oxide-coated metal particles, aluminum powder, gold powder, silver powder, copper powder, zinc powder, stainless steel powder, nickel powder, organic bentonite, iron oxide, carbon black, and graphite.

In addition, additives such as a photopolymerization initiator, wax, a pigment dispersant, an antifoaming agent, and a leveling agent can be used for the ink.

In the method for manufacturing a printed article using the coating agent for a film according to the present invention, the active energy ray-curable ink includes a plurality of active energy ray-curable white inks, and the active energy ray-curable white ink can also be used for so-called surface printing in which the active energy ray-curable white ink is first transferred to a film. Since the active energy ray-curable white ink generally has a background color and a large pattern area, when the active energy ray-curable white ink is stacked on a coating agent and cured, it is possible to improve not only ink adhesion to a printed article required for surface printing but also abrasion resistance of an ink film.

Examples of the method for transferring the coating agent according to the present invention to the film include flexographic printing, offset printing, gravure printing, screen printing, a varnish coater, a bar coater, and the like.

Among them, it is preferable that the transfer can be performed in a pattern shape, and printing methods such as flexographic printing, offset printing, gravure printing, and screen printing are preferable.

In particular, offset printing is preferable in which wet-on-wet printing can be performed even when the coating agent has a high viscosity of 30 Pa·s or more.

Among them, a waterless plate which does not use dampening water that reacts with the isocyanate groups contained in the coating agent, is more preferable.

Examples of the film used in the present invention include polyesters such as polyethylene, polypropylene, polyethylene terephthalate, polybutylene terephthalate, and polylactic acid, polyamide, polyimide, polyalkyl (meth)acrylate, polystyrene, polyα-methylstyrene, polycarbonate, polyvinyl alcohol, polyvinyl acetal, polyvinyl chloride, and polyvinylidene fluoride. These films may have surface treatment layers such as a corona treatment layer, a burning treatment layer, and an easily adhesive coating layer. The corona treatment layer may be a ready-made product, or may be one obtained by performing in-line corona treatment on the film before transferring the coating agent.

In particular, the film preferably has a barrier layer. Since the polar group exists on the outermost surface of these films, the isocyanate group and the polar group contained in the coating agent react with each other when the coating agent according to the present invention is transferred, and the adhesion between the film and the coating agent can be further improved. In addition, a barrier film refers to a film having a vapor-deposited thin film layer made of metal such as alumina or a metal compound.

The thickness of the film is preferably 5 μm or more, and more preferably 10 μm or more from the viewpoint of the mechanical strength of the film required for printing. Further, it is preferably 50 μm or less, more preferably 30 μm or less, because the cost of the film is low.

As the film, either a sheet film or a roll film can be used. When printing on a thin film for flexible packaging, it is preferable to print by a roll-to-roll method using a roll film.

EXAMPLES

Hereinafter, the present invention will be specifically described with reference to Examples. However, the present invention is not limited thereto.

<Measurement of Weight-Average Molecular Weight>

The weight-average molecular weight of the compound (a) was measured by gel permeation chromatography (GPC) using tetrahydrofuran as a mobile phase. The compound (a) prepared in each of examples and comparative examples was diluted with tetrahydrofuran so as to have a concentration of 0.25 mass %, the diluted solution was stirred at 100 rpm for 5 minutes with a mix rotor (MIX-ROTAR VMR-5, manufactured by AS ONE CORPORATION) to be dissolved, and the solution was filtered through a 0.2 μm filter (Z227536-100 EA, manufactured by SIGMA Corporation) to obtain a filtrate as a measurement sample. As GPC, HLC-8220 (manufactured by Tosoh Corporation) was used, as a column, TSKgel SuperHM-H (manufactured by Tosoh Corporation), TSKgel SuperHM-H (manufactured by Tosoh Corporation), and TSKgel SuperH 2000 (manufactured by Tosoh Corporation) were connected in this order, and as RI detection, an RI detector built in the GPC was used. An injection amount was 10 μL, an analysis time was 30 minutes, a flow rate was 0.4 mL/min, and a column temperature was 40° C. A calibration curve was prepared using a polystyrene standard, and the weight-average molecular weight of the sample was calculated.

<Measurement of Viscosity>

A cylinder spindle No. 4 was attached to a B-type viscometer DV-II manufactured by Brookfield (BROOKFIELD), and the viscosity of the coating agents 1 to 18 at 25° C. and 0.5 rpm was measured.

<Measurement of Acrylic Equivalent>

For the coating agents 1 to 18, a 1 wt. % solution of $CDCl_3$ was prepared, 0.05 wt. % of tetramethylsilane as an internal standard was added to seal the solution, and $^1$H-NMR measurement was performed. The molar ratio was determined from the integration ratio of the peak ($\delta$=5.8 to 6.5) of the (meth)acrylic group and the peak ($\delta$=−0.05 to +0.05) of the methyl group of tetramethylsilane as an internal standard, and the number of moles of the acrylic group in the coating agent was calculated to calculate the acrylic equivalent.

<Preparation of Active Energy Ray-Curable Ink>

[Black Ink 1]

A mixture of 12 parts by mass of a copolymer of methacrylic acid, methyl methacrylate, and styrene (acid value: 95 mg KOH/mg), 40 parts by mass of M340 (containing a hydroxyl group) manufactured by Miwon Specialty Chemical Co., Ltd. as polyfunctional (meth)acrylate, 26 parts by mass of M262 manufactured by Miwon Specialty Chemical Co., Ltd., 18 parts by mass of Mogul E manufactured by Cabot Corporation as a black pigment, 2 parts by mass of MICRO ACE P-8 manufactured by Nippon Talc Co., Ltd. as an extender pigment, 1 part by mass of Disper BYK 2013 manufactured by BYK Co., Ltd. as a dispersant, and 1 part by mass of KTL-4N manufactured by KITAMURA LIMITED as wax was kneaded with a three-roll mill to obtain a black ink 1.

[Black Ink 2]

A mixture of 30 parts by mass of DAISODAP (registered trademark) K manufactured by Osaka Soda Company as diallyl phthalate resin, 25 parts by mass of M600 (containing a hydroxyl group) manufactured by Miwon Specialty Chemical Co., Ltd. as polyfunctional (meth)acrylate, 23 parts by mass of M3130 manufactured by Miwon Specialty Chemical Co., Ltd., 18 parts by mass of Mogul E manufactured by Cabot Corporation as a black pigment, 2 parts by mass of MICRO ACE P-8 manufactured by Nippon Talc Co., Ltd. as an extender pigment, 1 part by mass of Disper BYK 2013 manufactured by BYK Co., Ltd. as a dispersant, and 1 part by mass of KTL-4N manufactured by KITAMURA LIMITED as wax was kneaded with a three-roll mill to obtain a black ink 2.

[White Ink 3]

A mixture of 7 parts by mass of a copolymer of methacrylic acid, methyl methacrylate, and styrene (acid value: 95 mg KOH/mg), 23 parts by mass of M340 (containing a hydroxyl group) manufactured by Miwon Specialty Chemical Co., Ltd. as polyfunctional (meth)acrylate, 23 parts by mass of M262 manufactured by Miwon Specialty Chemical Co., Ltd., 45 parts by mass of TIPAQUE CR58-2 manufactured by Ishihara Sangyo Kaisha, Ltd. as a white pigment, 1 part by mass of Disper BYK 111 manufactured by BYK Co., Ltd. as a dispersant, and 1 part by mass of KTL-4N manufactured by KITAMURA LIMITED as wax was kneaded with a three-roll mill to obtain a white ink 3.

<Film Used>

Film 1: 12 μm-thick PET film (E5102 manufactured by TOYOBO CO., LTD.), with a corona treatment layer Film 2: 12 μm-thick PET film (FS 2000 manufactured by FUTAMURA CHEMICAL CO., LTD.), without a surface treatment Film 3: 12 μm-thick PET film (PTM manufactured by UNITIKA LTD.), with an easily adhesive coating layer Film 4: 12 μm-thick barrier film/PET film laminate (1011HG SBR2 manufactured by TORAY ADVANCED FILM CO., LTD.)

Film 5: 15 μm-thick polyamide film (ON manufactured by UNITIKA LTD.) with a corona treatment layer.

<Printing Test>

A configuration common to the following printing methods 1 to 5 will be described. CI-8 manufactured by Comexi was used as a flexible packaging lithographic printing machine capable of installing up to 7 blanket cylinders. In the following printing methods 1 to 5, the installation positions of the seven blanket cylinders are referred to as a first cylinder, a second cylinder, a third cylinder, a fourth cylinder, a fifth cylinder, a sixth cylinder, and a seventh cylinder in order from the upstream side in the traveling direction of the film to be printed. Although the installation position of the blanket cylinder not mentioned in each printing method is not impression-throw-in, color printing can be performed by installing the transfer step of cyan, magenta, and yellow inks at the installation position not mentioned.

In common with the following printing methods 1 to 5, TAC-VT4 manufactured by Toray Industries, Inc. was used as a waterless lithographic printing plate. The printing speed was 150 m/min. In addition, electron beam irradiation was performed under conditions of an acceleration voltage of 110 kV and an irradiation dose of 30 kGy.

[Printing Method 1]

In the printing method 1, a printed image was a mirror image for back printing. A waterless lithographic printing plate of which the entire surface was a printing portion and a coating agent prepared according to the corresponding example or comparative example were set in the first cylinder, the black ink was set in the third cylinder, and the coating agent and the active energy ray-curable ink were transferred onto the film in this order in a wet-on-wet manner. The amount of ink supplied was adjusted so that the reflection density of a black solid part in the printed article was 1.8 by a reflection densitometer (SpectroEye manufactured by GretagMacbeth). Then, the coating agent and the active energy ray-curable ink were cured by electron beam irradiation.

[Printing Method 2]

In the printing method 2, a printed image was a mirror image for back printing. A waterless lithographic printing plate of which the entire surface was a printing portion and a coating agent prepared according to a corresponding example or comparative example were set in the first cylinder, only the coating agent was printed on a film, and then cured by electron beam irradiation, and the film was once wound up. The wound film was again set in a flexible packaging lithographic printing machine, a black ink was set in the third cylinder, and only the active energy ray-curable black ink was transferred in the same amount of ink supplied as in Printing Method 1. Then, the active energy ray-curable ink was cured by electron beam irradiation.

[Printing Method 3]

In the printing method 3, the printed image was a normal image for surface printing. A waterless lithographic printing plate of which the entire surface was a printing portion and a coating agent prepared according to a corresponding example or comparative example were set in the first cylinder, the white ink 3 was set in the second cylinder, and the black ink was set in the third cylinder. The coating agent, the white ink and the black ink were transferred onto the film in this order in a wet-on-wet manner. The amount of ink supplied was adjusted so that the reflection density of a black solid part in the printed article was 1.8 by a reflection densitometer (SpectroEye manufactured by GretagMacbeth). Then, the coating agent and the active energy ray-curable ink were cured by electron beam irradiation.

[Printing Method 4]

In the printing method 4, a printed image was a mirror image for back printing. A waterless lithographic printing plate in which a position corresponding to a printing portion of a black ink was patterned in a solid printing portion and a coating agent prepared according to the corresponding example were set in the first cylinder, and the black ink was set in the third cylinder. The coating agent and the active energy ray-curable ink were transferred onto the film in this order in a wet-on-wet manner. The amount of ink supplied was adjusted so that the reflection density of a black solid part in the printed article was 1.8 by a reflection densitometer (SpectroEye manufactured by GretagMacbeth). Then, the coating agent and the active energy ray-curable ink were cured by electron beam irradiation.

[Printing Method 5]

In the printing method 5, the printed image was a normal image for surface printing. The white ink 3 was set in the second cylinder, a black ink was set in the third cylinder, a waterless lithographic printing plate of which the entire surface was a printing portion, and a coating agent prepared in each example were set in the seventh cylinder. The active energy ray-curable ink and the coating agent were transferred onto the film in this order in a wet-on-wet manner. The amount of ink supplied was adjusted so that the reflection density of a black solid part in the printed article was 1.8 by a reflection densitometer (SpectroEye manufactured by GretagMacbeth). Then, the coating agent and the active energy ray-curable ink were cured by electron beam irradiation.

<Evaluation of Adhesion>

(Laminate Peeling Strength)

A mixed laminate adhesive (TAKELAC A 626/TAKENATE A-50, manufactured by Mitsui Chemicals, Inc.) was applied to the back printed article (Examples 1 to 23, Comparative Examples 4 and 5) obtained by the printing test so as to have a film thickness of 3.0 g/m², and the back printed article was stacked with a 60 μm-thick unstretched polypropylene film (CPP) (ZK-297, manufactured by TORAY ADVANCED FILM CO., LTD.). Thereafter, aging was performed at 40° C. for 3 days to obtain a laminate sample. The black solid part in the laminate sample was cut into a strip shape with a width of 15 mm, and the strip was peeled off at 90° at 300 mm/min using a Tensilon universal tester (RTG-1210 manufactured by ORIENTEC CORPORATION) to measure the peeling strength.

When the peeling strength was less than 1.0 N/15 mm, the adhesion was insufficient, when the peeling strength was 1.0 N/15 mm or more and less than 1.5 N/15 mm, the adhesion was slightly good, when the peeling strength was 1.5 N/15 mm or more and less than 2.0 N/15 mm, the adhesion was good, when the peeling strength was 2.0 N/15 mm or more and less than 3.0 N/15 mm, the adhesion was considerably good, and when the peeling strength was 3.0 N/15 mm or more, the adhesion was determined to be extremely good.

(Fracture Mode)

In addition, the state at the time of peeling (fracture mode) was also observed. In the laminate sample having a multilayer structure, an interlayer where breakage occurs at the time of peeling corresponds to a portion where adhesion is the weakest. The fracture mode includes breakage of the film, peeling between the film and the coating layer, and peeling between the coating layer and the ink layer, and the case of breakage of the film is more preferable from the viewpoint of adhesion. Here, the "coating layer" refers to a layer formed by curing a coating agent.

In Comparative Examples 2 and 3, since the coating agent could not be sufficiently cured as described later, the adhesion was not evaluated.

(Cellophane Tape Peeling)

An optional range of 30 mm×18 mm in the ink film of the surface printed article (Examples 24 and 25, Comparative Example 1) was evaluated by cellophane tape peeling using "CELLOTAPE" (registered trademark) No. 405 (width 18 mm) manufactured by Nichiban Co., Ltd.

A: Ink film was not peeled off.

B: Most of ink film was peeled off.

<Evaluation of Abrasion Resistance of Printed Article>

An optional range of 3 cm×3 cm in the ink film of the surface printed article was rubbed back and forth 20 times with a nail, and the degree of scratches was evaluated.

A: No scratches due to nails were observed.

B: Ink was completely peeled off along nail mark, and film was exposed.

<Evaluation of Curability of Coating Agent>

In the printing method 1, curability was evaluated at optional five positions where the black ink was not printed, that is, the coating agent was the outermost layer.

A: When palpated at all points, uncured material did not adhere to palpated area and was cured.

B: When palpated at any point, uncured material adhered to palpated area and was not completely cured.

<Evaluation of Storage Stability of Coating Agent>

The coating agent was stored in a sealed container at normal pressure around 25° C. for 1 week, and then the presence or absence of gelation was determined by visual observation, fluidity at the time of inclination, and palpation with a spatula.

A: No gelation was observed.

B: Gelation was partially observed.

C: Coating agent was completely gelled.

<Gloss Measurement of Non-Printing Portion of Printed Article>

60 degree specular glossiness of the non-printing portion of the printed article, that is, a portion where the coating agent was the outermost layer was measured in accordance with the provision of JIS Z8741-1997 using a precision gloss meter (GM-26PRO manufactured by MURAKAMI COLOR RESEARCH LABORATOR). The gloss was evaluated poor when the gloss value was 60 or less, good when the gloss value was 90 or more, and excellent when the gloss value was 120 or more.

<Raman Spectroscopic Measurement of Outermost Surface of Printed Article>

With respect to a portion where the coating agent was the outermost layer, such as a non-printing portion of the printed article, a cross section of any one portion was cut out with a microtome, and Raman spectrometry was performed using a Raman spectrometer (T-64000 manufactured by HORIBA/Jobin Yvon) and a detector CCD (1024×256 manufactured by HORIBA/Jobin Yvon). The measurement was performed under the conditions of an objective lens of 100 times, a beam diameter of 1 μm, and a slit of 100 μm, and argon ion laser (wavelength: 514.5 nm) was used as a light source. Regarding the carbon-carbon double bond of the ethylenically unsaturated group derived from the reaction residue of the (meth)acryloyl group with a peak observed in the range of 1600 to 1650 cm$^{-1}$, and the carbonyl group of the (meth)acryloyl group with a peak observed in the range of 1650 to 1750 cm$^{-1}$, the peak area was measured for each, and the area ratio of carbon-carbon double bond/carbonyl group was calculated.

<Raw Materials, Compounds, and the Like Used>

Hydroxyl group-containing (meth)acrylate 1: 2-hydroxyethyl acrylate "LIGHT ESTER" (registered trademark) HOA (manufactured by Kyoeisha Chemical Co., Ltd.)

Hydroxyl group-containing (meth)acrylate 2: Mixture of pentaerythritol triacrylate and pentaerythritol tetraacrylate "Miramer" (registered trademark) M340 (manufactured by Miwon Specialty Chemical Co., Ltd.)

Polyisocyanate compound 1: "Coronate" (registered trademark) HX (manufactured by Tosoh Corporation)

Polyisocyanate compound 2: Isocyanate group-terminated urethane resin "TAKENATE" (registered trademark) A-65 (manufactured by Mitsui Chemicals, Inc.)

Polyol compound 1: Polypropylene glycol "PREMINOL" (registered trademark) 5001F (manufactured by AGC Inc.)

Polyol compound 2: Polyester polyol "VYLON" (registered trademark) 220 (manufactured by Toyobo Co., Ltd.)

Compound (b) 1: Urethane isocyanate containing neither acryloyl group nor polyester structure ("ECOAD" (registered trademark) EA-N373A)

Compound (b) 2: Urethane acrylate ("ARONIX" (registered trademark) UA-306T manufactured by Kyoeisha Chemical Co., Ltd.) containing acryloyl group but not containing polyester structure Compound (b) 3: Urethane acrylate "ARONIX" (registered trademark) M-1200 (manufactured by Toagosei Co., Ltd.) containing an acryloyl group and a polyester structure, White pigment (c): Titanium oxide ("TIPAQUE" (registered trademark) CR58-2 manufactured by Ishihara Sangyo Kaisha, Ltd.)

Wax (d): Polyethylene wax ("Hi-Wax" (registered trademark) 320P manufactured by Mitsui Chemicals, Inc.)

Diluting agent: Trimethylolpropane acrylate ethylene oxide adduct ("Miramer" (registered trademark) M3130 manufactured by Miwon Specialty Chemical Co., Ltd.)

Solvent: Ethyl acetate

Examples 1 to 16

(Coating Agent 1 to 11)

(Meth)acrylate having a hydroxyl group, a polyisocyanate compound, and a polyol compound were mixed at a ratio shown in Tables 1 and 2, and reacted by heating and stirring at 60° C. for 6 hours to produce a compound (a), which was used as a coating agents 1 to 11. As a result of checking the molecular structure of each compound (a) of the coating agents 1 to 11 by 1H NMR, it was found that any compound (a) included a compound (a) having two or more (meth)acryloyl groups and an isocyanate group.

The acrylic equivalents of the coating agents 1 to 11, the isocyanate content of the coating agent, and the weight-average molecular weight of the compound (a) are shown in Tables 1 and 2.

(Coating Agents 12 and 13)

(Meth)acrylate having a hydroxyl group, a polyisocyanate compound, and a polyol compound were mixed at a ratio shown in Table 3, and reacted by heating and stirring at 60° C. for 6 hours to produce a compound (a). Furthermore, a diluting agent or a solvent was added to the obtained compound (a) at a ratio shown in Table 3, and the mixture was stirred and mixed at 60° C. for 1 hour. These compositions were used as coating agents 12 and 13. As a result of checking the molecular structure of each compound (a) of the coating agents 12 and 13 by 1H NMR, it was found that any compound (a) included a compound (a) having two or more (meth)acryloyl groups and an isocyanate group.

The acrylic equivalents of the coating agents 12 and 13, the isocyanate content of the coating agent, and the weight-average molecular weight of the compound (a) are shown in Table 3.

(Coating Agents 14 to 16)

(Meth)acrylate having a hydroxyl group, a polyisocyanate compound, and a polyol compound were mixed at a ratio shown in Table 4, and reacted by heating and stirring at 60° C. for 6 hours to produce a compound (a). Furthermore, a compound (b) was added to the obtained compound (a) at a ratio shown in Table 4, and the mixture was stirred and mixed at 60° C. for 1 hour. These compositions were used as coating agents 14 to 16. As a result of checking the molecular structure of each compound (a) of the coating agents 14 to 16 by 1H NMR, it was found that any compound (a) included a compound (a) having two or more (meth)acryloyl groups and an isocyanate group.

The acrylic equivalents of the coating agents 14 and 16, the isocyanate content of the coating agent, and the weight-average molecular weight of the compound (a) are shown in Table 4.

TABLE 3

|  |  |  | Coating agent | |
|  |  |  | 12 | 13 |
| --- | --- | --- | --- | --- |
| Composition (parts by mass) | Compound (a) | (Meth)acrylate 1 having hydroxyl group | 30 | 30 |
|  |  | (Meth)acrylate 2 having hydroxyl group | — | — |
|  |  | Polyisocyanate compound 1 | 29 | 29 |
|  |  | Polyisocyanate compound 2 | — | — |
|  |  | Polyol compound 1 | — | — |
|  |  | Polyol compound 2 | 6 | 6 |
|  | Diluting agent |  | 35 | — |
|  | Solvent |  | — | 35 |
| Physical properties | Acrylic equivalent (g/eq) |  | 192 | 387 |
|  | Isocyanate content (mass %) |  | 3.1 | 3.0 |
|  | Weight-average molecular weight of compound (a) |  | 1400 | 1500 |
|  | Viscosity (Pa · s) |  | 13 | 7 |

TABLE 1

|  |  |  | Coating agent | | | | | |
|  |  |  | 1 | 2 | 3 | 4 | 5 | 6 |
| --- | --- | --- | --- | --- | --- | --- | --- | --- |
| Composition (parts by mass) | Compound (a) | (Meth)acrylate 1 having hydroxyl group | 46 | 58 | 31 | 13 | 9 | 58 |
|  |  | (Meth)acrylate 2 having hydroxyl group | — | — | — | 11 | 6 | — |
|  |  | Polyisocyanate compound 1 | 45 | 31 | 33 | 27 | 16 | — |
|  |  | Polyisocyanate compound 2 | — | — | — | — | 13 | 31 |
|  |  | Polyol compound 1 | — | — | — | — | — | — |
|  |  | Polyol compound 2 | 9 | 11 | 36 | 49 | 56 | 11 |
| Physical properties | Acrylic equivalent (g/eq) |  | 252 | 200 | 374 | 444 | 717 | 200 |
|  | Isocyanate content (mass %) |  | 4.7 | 0.8 | 2.3 | 2.5 | 2.0 | 1.7 |
|  | Weight-average molecular weight of compound (a) |  | 1500 | 2900 | 4200 | 7400 | 11200 | 2200 |
|  | Viscosity (Pa · s) |  | 33 | 52 | 78 | 156 | 211 | 38 |

TABLE 2

|  |  |  | Coating agent | | | | |
|  |  |  | 7 | 8 | 9 | 10 | 11 |
| --- | --- | --- | --- | --- | --- | --- | --- |
| Composition (parts by mass) | Compound (a) | (Meth)acrylate 1 having hydroxyl group | 50 | 41 | 39 | 35 | — |
|  |  | (Meth)acrylate 2 having hydroxyl group | — | — | — | — | 23 |
|  |  | Polyisocyanate compound 1 | 40 | 50 | 53 | 58 | 77 |
|  |  | Polyisocyanate compound 2 | — | — | — | — | — |
|  |  | Polyol compound 1 | — | — | — | — | — |
|  |  | Polyol compound 2 | 10 | 9 | 8 | 7 | — |
| Physical properties | Acrylic equivalent (g/eq) |  | 232 | 283 | 297 | 331 | 422 |
|  | Isocyanate content (mass %) |  | 3.1 | 7.5 | 9.3 | 13.0 | 5.3 |
|  | Weight-average molecular weight of compound (a) |  | 1600 | 1400 | 1100 | 1100 | 750 |
|  | Viscosity (Pa · s) |  | 33 | 30 | 26 | 21 | 8 |

TABLE 4

| | | | Coating agent | | | | |
|---|---|---|---|---|---|---|---|
| | | | 14 | 15 | 16 | 17 | 18 |
| Composition (parts by mass) | Compound (a) | (Meth)acrylate 1 having hydroxyl group | 30 | 30 | 30 | 30 | 31 |
| | | (Meth)acrylate 2 having hydroxyl group | — | — | — | — | — |
| | | Polyisocyanate compound 1 | 29 | 29 | 29 | 29 | 33 |
| | | Polyisocyanate compound 2 | — | — | — | — | — |
| | | Polyol compound 1 | — | — | — | — | — |
| | | Polyol compound 2 | 6 | 6 | 6 | 6 | 36 |
| | Compound (b) | Compound (b) 1 | 35 | — | — | — | — |
| | | Compound (b) 2 | — | 35 | — | — | — |
| | | Compound (b) 3 | — | — | 35 | — | — |
| | | white pigment (c) | — | — | — | 35 | — |
| | | Wax (d) | — | — | — | — | 1 |
| Physical properties | | Acrylic equivalent (g/eq) | 387 | 187 | 279 | 387 | 378 |
| | | Isocyanate content (mass %) | 6.6 | 3.1 | 3.0 | 3.0 | 2.3 |
| | | Weight-average molecular weight of compound (a) | 1400 | 1400 | 1400 | 1400 | 4200 |
| | | Viscosity (Pa · s) | 25 | 42 | 71 | 45 | 78 |

Using the prepared coating agents 1 to 16, film 1, and ink 1, a printed article was prepared by the printing method 1. As the diluting agent and solvent were small, the isocyanate content of the compound (a) was high, and the acrylic equivalent was also small, the coating agent reacted with the film and the active energy ray-curable ink, and the adhesion tended to increase. In addition, as the viscosity of the coating agent was lower, the glossiness of the non-printing portion of the printed article tended to be higher, but in Examples 9 to 14 having a lower viscosity, scattering of the coating agent in the printer was observed. The results are shown in Tables 5 and 6.

TABLE 5-1

| | Examples | | | |
|---|---|---|---|---|
| | 1 | 2 | 3 | 4 |
| Coating agent | 1 | 2 | 3 | 4 |
| Film | 1 | 1 | 1 | 1 |
| Black ink | 1 | 1 | 1 | 1 |
| Printing method | 1 | 1 | 1 | 1 |
| Curability of coating agent | A | A | A | A |
| Storage stability of coating agent | A | A | A | A |
| Laminate peeling strength (N/15 mm) | 3.8 | 1.5 | 3.4 | 2.2 |
| Fracture mode | Printing film breakage | Peeling between film/ coating layer | Printing film breakage | Peeling between coating layer/ink |
| Glossiness | 117 | 107 | 96 | 73 |
| Area ratio of carbon-carbon double bond/carbonyl group | 0.8 | 1.5 | 0.5 | 0.5 |

TABLE 5-2

| | Examples | | | |
|---|---|---|---|---|
| | 5 | 6 | 7 | 8 |
| Coating agent | 5 | 6 | 7 | 8 |
| Film | 1 | 1 | 1 | 1 |
| Black ink | 1 | 1 | 1 | 1 |
| Printing method | 1 | 1 | 1 | 1 |
| Curability of coating agent | A | A | A | A |
| Storage stability of coating agent | A | A | A | A |
| Laminate peeling strength (N/15 mm) | 1.5 | 1.4 | 3.3 | 3.6 |

TABLE 5-2-continued

| | Examples | | | |
|---|---|---|---|---|
| | 5 | 6 | 7 | 8 |
| Fracture mode | Peeling between coating layer/ink | Peeling between film/ coating layer | Printing film breakage | Printing film breakage |
| Glossiness | 55 | 116 | 114 | 122 |
| Area ratio of carbon-carbon double bond/carbonyl group | 0.4 | 1.4 | 1.0 | 0.7 |

TABLE 6-1

| | Examples | | | |
|---|---|---|---|---|
| | 9 | 10 | 11 | 12 |
| Coating agent | 9 | 10 | 11 | 12 |
| Film | 1 | 1 | 1 | 1 |
| Black ink | 1 | 1 | 1 | 1 |
| Printing method | 1 | 1 | 1 | 1 |
| Curability of coating agent | A | A | A | A |
| Storage stability of coating agent | B | C | A | A |
| Laminate peeling strength (N/15 mm) | 3.3 | 2.5 | 2.0 | 1.4 |
| Fracture mode | Printing film breakage | Peeling between coating layer/ink | Peeling between film/ coating layer | Peeling between film/ coating layer |
| Glossiness | 125 | 126 | 130 | 130 |
| Area ratio of carbon-carbon double bond/carbonyl group | 0.7 | 0.5 | 0.3 | 1.7 |

TABLE 6-2

| | Examples | | | |
|---|---|---|---|---|
| | 13 | 14 | 15 | 16 |
| Coating agent | 13 | 14 | 15 | 16 |
| Film | 1 | 1 | 1 | 1 |
| Black ink | 1 | 1 | 1 | 1 |
| Printing method | 1 | 1 | 1 | 1 |
| Curability of coating agent | A | A | A | A |

TABLE 6-2-continued

|  | Examples | | | |
|  | 13 | 14 | 15 | 16 |
| --- | --- | --- | --- | --- |
| Storage stability of coating agent | A | B | A | A |
| Laminate peeling strength (N/15 mm) | 1.1 | 2.6 | 3.1 | 3.1 |
| Fracture mode | Peeling between film/ coating layer | Peeling between coating layer/ink | Printing film breakage | Printing film breakage |
| Glossiness | 132 | 125 | 115 | 96 |
| Area ratio of carbon-carbon double bond/carbonyl group | 0.9 | 1.1 | 0.6 | 0.7 |

Example 17

A printed article was prepared in the same manner as in Example 1 except that the printing method was changed to the printing method 2. Although the adhesion was lower than that in the printing method 1, the printing density tended to improve from 1.8 to 2.0. The results are shown in Table 7.

Examples 18 to 21

A printed article was prepared in the same manner as in Example 1 except that the films were changed as shown in Table 7. The adhesion with the coating agent varied depending on the film, and films containing many polar groups on the surface, such as a film having a corona treatment layer, a film having an easily adhesive layer, and a transparent vapor deposition film, tended to exhibit good adhesion. The results are shown in Table 7.

Example 22

A printed article was prepared in the same manner as in Example 1 except that the black ink 1 was changed to the black ink 2. The adhesion with the coating agent varied depending on the active energy ray-curable ink, and the ink 1 containing a polar group had better adhesion than that of the ink 2. The results are shown in Table 7.

Example 23

(Coating Agent 17)
(Meth)acrylate having a hydroxyl group, a polyisocyanate compound, and a polyol compound were mixed at a ratio shown in Table 4, and reacted by heating and stirring at 60° C. for 6 hours to produce a compound (a). Furthermore, a white pigment (c) was added to the obtained compound (a) at a ratio shown in Table 4, and the mixture was stirred and mixed at 60° C. for 1 hour. This composition was used as a coating agent 17. As a result of checking the molecular structure of each compound (a) of the coating agent 17 by 1H NMR, it was found that a compound (a) having two or more (meth)acryloyl groups and an isocyanate group was included.
A printed article was prepared in the same manner as in Example 1 except that the printing method was changed to the printing method 4 by using the coating agent 17. The coating agent was transferred only to a portion corresponding to the image, and hiding property by white was checked. The adhesion was as good as 2.2 N/15 mm.

TABLE 7-1

|  | Examples | | | |
|  | 17 | 18 | 19 | 20 |
| --- | --- | --- | --- | --- |
| Coating agent | 1 | 1 | 1 | 1 |
| Film | 1 | 2 | 3 | 4 |
| Black ink | 1 | 1 | 1 | 1 |
| Printing method | 2 | 1 | 1 | 1 |
| Laminate peeling strength (N/15 mm) | 1.2 | 1.4 | 2.7 | 4.2 |
| Fracture mode | Peeling between coating layer/ink | Peeling between film/ coating layer | Peeling between film/ coating layer | Printing film breakage |
| Print density | 2.0 | 1.8 | 1.8 | 1.8 |
| Glossiness | 115 | 110 | 114 | 117 |
| Area ratio of carbon-carbon double bond/carbonyl group | 0.5 | 0.7 | 0.8 | 0.7 |

TABLE 7-2

|  | Examples | | |
|  | 21 | 22 | 23 |
| --- | --- | --- | --- |
| Coating agent | 1 | 1 | 17 |
| Film | 5 | 1 | 1 |
| Black ink | 1 | 2 | 1 |
| Printing method | 1 | 1 | 4 |
| Laminate peeling strength (N/15 mm) | 4.1 | 2.5 | 2.2 |
| Fracture mode | Printing film breakage | Peeling between coating layer/ink | Peeling between coating layer/ink |
| Print density | 1.8 | 1.8 | 1.8 |
| Glossiness | 114 | 113 | — |
| Area ratio of carbon-carbon double bond/carbonyl group | 0.7 | 0.7 | — |

Example 24

A printed article was prepared in the same manner as in Example 1 except that the printing method was changed to the printing method 3. Since Example 24 is a printed article obtained by surface printing, cellophane tape peeling and abrasion resistance of the printed article were evaluated. The ink/coating layer and the coating layer/film were strongly adhered to each other, and no peeling due to the cellophane tape or peeling due to nail rubbing was observed at all.

Example 25

(Coating Agent 18)
(Meth)acrylate having a hydroxyl group, a polyisocyanate compound, and a polyol compound were mixed at a ratio shown in Table 4, and reacted by heating and stirring at 60° C. for 6 hours to produce a compound (a). Furthermore, wax (d) was added to the obtained compound (a) at a ratio shown in Table 4, and the mixture was stirred and mixed at 60° C. for 1 hour. This composition was used as a coating agent 18. As a result of checking the molecular structure of each compound (a) of the coating agent 18 by 1H NMR, it was found that a compound (a) having two or more (meth) acryloyl groups and an isocyanate group was included.

A printed article was prepared in the same manner as in Example 24 except that the printing method was changed to the printing method 5 by using the coating agent 18 was used as a coating agent. That is, in Example 24, the coating agent was used as an anchor coat, but in Example 25, the coating agent was used as an overcoat agent for the entire printing surface. Since Example 25 is also a printed article obtained by surface printing, cellophane tape peeling and abrasion resistance of the printed article were evaluated. The ink/ coating layer and the coating layer/film were strongly adhered to each other, and no peeling due to the cellophane tape or peeling due to nail rubbing was observed at all.

Comparative Example 1

A printed article was prepared in the same manner as in Example 20 except that the coating agent was not used. Since Comparative Example 1 is a printed article obtained by surface printing, cellophane tape peeling and abrasion resistance of the printed article were evaluated. The adhesion between the ink and the film was extremely low, and the ink was completely peeled off from the white ink as a base due to the cellophane tape peeling, and the abrasion resistance was also insufficient.

TABLE 8

| | Examples | | Comparative Example |
|---|---|---|---|
| | 24 | 25 | 1 |
| Coating agent | 1 | 18 | Absent |
| Film | 1 | 1 | 1 |
| Black ink | 1 | 1 | 1 |
| Printing method | 3 | 5 | 3 |
| Print density | 1.8 | 1.8 | 1.8 |
| Cellophane tape peeling | A | A | B |
| Abrasion resistance | A | A | B |
| Glossiness | 115 | 91 | — |
| Area ratio of carbon-carbon double bond/carbonyl group | 0.5 | 0.5 | — |

Comparative Examples 2 to 4

(Coating Agent 19)

A polyisocyanate compound 1 was used alone as a target to be compared with the compound (a), a diluting agent was added at a charging ratio shown in Table 9, and the mixture was stirred and mixed at 60° C. for 1 hour. This composition was used as a coating agent 19.

(Coating Agent 20)

Polyisocyanate compounds 1 and 2 and a polyol compound 1 were heated and stirred at 60° C. for 6 hours to react at the charging ratio shown in Table 9, and thereby a target to be compared with the compound (a) was prepared, and used as a coating agent 20.

(Coating Agent 21)

(Meth)acrylate 1 having a hydroxyl group and a polyol compound 1 were heated and stirred at 60° C. for 6 hours to react at the charging ratio shown in Table 9, and thereby a target to be compared with the compound (a) was prepared, and used as a coating agent 21.

TABLE 9

| | | | Coating agent | | |
|---|---|---|---|---|---|
| | | | 19 | 20 | 21 |
| Composition (parts by mass) | Comparative target with compound (a) | (Meth)acrylate 1 having hydroxyl group | — | — | 80 |
| | | (Meth)acrylate 2 having hydroxyl group | — | — | — |
| | | Polyisocyanate compound 1 | 70 | 25 | — |
| | | Polyisocyanate compound 2 | — | 39 | — |
| | | Polyol compound 1 | — | 36 | 20 |
| | | Polyol compound 2 | — | — | — |
| | Diluting agent | | 30 | — | — |
| Physical properties | Acrylic equivalent (g/eq) | | 447 | 0 | 145 |
| | Isocyanate content (mass %) | | 14.6 | 8.5 | 0.0 |
| | Weight-average molecular weight of target to be compared with compound (a) | | 700 | 7200 | 2000 |
| | Viscosity (Pa · s) | | 1 | 195 | 2 |

Using the prepared coating agents 19 to 21, film 1, and ink 1, a printed article was prepared by the printing method 1. The coating agent 19 having no (meth)acryloyl group and no isocyanate group in the same compound was not completely cured. Further, the coating agent 20 having no (meth) acryloyl group was not cured at all due to insufficient sensitivity. In addition, the coating agent 21 had low adhesion to the film, and peeling was observed at the interface between the coating agent layer and the film. The results are shown in Table 10.

Comparative Example 5

Using the coating agents, film 1, and ink 1, a printed article was prepared by the printing method 1. The adhesion with the film was extremely low, and peeling was observed at the interface between the ink and the film.

TABLE 10

| | Comparative Examples | | | |
|---|---|---|---|---|
| | 2 | 3 | 4 | 5 |
| Coating agent | 19 | 20 | 21 | Absent |
| Film | 1 | 1 | 1 | 1 |
| Black ink | 1 | 1 | 1 | 1 |

TABLE 10-continued

| | Comparative Examples | | | |
| --- | --- | --- | --- | --- |
| | 2 | 3 | 4 | 5 |
| Printing method | 1 | 1 | 1 | 1 |
| Curability of coating agent | B | B | A | — |
| Storage stability of coating agent | C | A | A | — |
| Laminate peeling strength (N/15 mm) | — | — | 0.1 | 0.3 |
| Fracture mode | — | — | Peeling between film/ coating layer | Peeling between film/ink |
| Glossiness | — | — | 133 | — |
| Area ratio of carbon-carbon double bond/carbonyl group | — | — | 2.8 | — |

The invention claimed is:

1. A coating agent for a film comprising a compound (a) having two or more (meth)acryloyl groups and an isocyanate group;

wherein the compound (a) is contained in an amount of 70 mass % or more and 100 mass % or less based on the total mass of the coating agent; and wherein an acrylic equivalent, calculated based on a total of (meth)acryloyl groups in the entire coating agent, of the coating agent is 100 g/eq or more and 450 g/eq or less.

2. The coating agent for a film according to claim 1, wherein the coating agent for a film is an active energy ray-curable anchor coating agent.

3. The coating agent for a film according to claim 1, wherein an isocyanate content of the coating agent is 2 mass % or more and 10 mass % or less.

4. The coating agent for a film according to claim 1, wherein the compound (a) has a urethane bond.

5. The coating agent for a film according to claim 1, wherein a weight-average molecular weight of the compound (a) is 1,000 or more and 5,000 or less.

6. The coating agent for a film according to claim 1, wherein the compound (a) has a structure obtained by reacting (meth)acrylate having a hydroxyl group, a polyol compound, and a polyisocyanate compound, and in the compound (a), a content of the isocyanate group is 0.9 mol or more and 2.2 mol or less with respect to 1 mol of the hydroxyl group.

7. The coating agent for a film according to claim 6, wherein the polyol compound is polyester polyol.

8. The coating agent for a film according to claim 1, further comprising a urethane compound (b).

9. The coating agent for a film according to claim 8, wherein the compound (b) has a (meth)acryloyl group.

10. The coating agent for a film according to claim 1, wherein a viscosity of the coating agent at 25° C. and a rotation speed of 0.5 rpm is 30 Pa·s or more and 200 Pa's or less.

11. A laminate comprising a cured layer of the coating agent for a film described in claim 1 on at least one surface of the film.

12. The laminate according to claim 11, wherein an area ratio of a carbon-carbon double bond/a carbonyl group in the cured layer by Raman spectrometry measurement is 0.5 or more and 2.5 or less.

13. A method for manufacturing a printed article, the method comprising a step of transferring the coating agent for a film described in claim 1 and an active energy ray-curable ink to a film and then irradiating the film with an active energy ray.

14. The method for manufacturing a printed article according to claim 13, wherein the active energy ray-curable ink contains a compound (e) having an ethylenically unsaturated group and having at least one functional group selected from the group consisting of an amino group, a hydroxyl group, and an acidic group.

15. The method for manufacturing a printed article according to claim 13, wherein the active energy ray-curable ink includes a plurality of colors including an active energy ray-curable white ink, and in the step of transferring the active energy ray-curable ink to the film, the active energy ray-curable white ink is first transferred.

16. The method for manufacturing a printed article according to claim 13, wherein the coating agent for a film is transferred to the film in a pattern.

17. The coating agent for a film according to claim 1, wherein the acrylic equivalent is 200 g/eq or more and 350 g/eq or less.

18. The coating agent for a film according to claim 17, wherein an isocyanate content of the coating agent is 2 mass % or more and 10 mass % or less.

* * * * *